(12) United States Patent
Shen

(10) Patent No.: US 8,194,138 B2
(45) Date of Patent: Jun. 5, 2012

(54) PORTABLE ELECTRONIC DEVICE AND CAMERA MODULE THEREOF

(75) Inventor: Chang-Han Shen, Hsinchu (TW)

(73) Assignee: Getac Technology Corporation, Hsinchu (TW)

( * ) Notice: Subject to any disclaimer, the term of this patent is extended or adjusted under 35 U.S.C. 154(b) by 365 days.

(21) Appl. No.: 12/337,479

(22) Filed: Dec. 17, 2008

(65) Prior Publication Data

US 2010/0149743 A1   Jun. 17, 2010

(51) Int. Cl.
 H04N 5/225 (2006.01)
 H04N 9/07 (2006.01)
(52) U.S. Cl. ............... 348/207.1; 348/337; 348/334; 348/373
(58) Field of Classification Search ............... 348/207.1, 348/337, 344, 373–376, 207.99, 207.11
See application file for complete search history.

(56) References Cited

U.S. PATENT DOCUMENTS

| | | | | |
|---|---|---|---|---|
| 6,339,508 | B1 * | 1/2002 | Nozawa et al. | 359/686 |
| 7,567,287 | B2 * | 7/2009 | Hyatt | 348/340 |
| 2002/0061767 | A1 * | 5/2002 | Sladen et al. | 455/556 |
| 2006/0268157 | A1 * | 11/2006 | Chang | 348/207.1 |

* cited by examiner

*Primary Examiner* — Nhan T Tran

(57) ABSTRACT

A portable electronic device includes a flat display, a transparent window, an optical element, an optical zoom lens set and an image sensing element. The flat display includes a display panel with a viewing direction. The transparent window, the optical element, the optical zoom lens set and the image sensing element are all configure in the outer frame of the flat display. The transparent window and the optical element correspond to each other and align in the viewing direction. The optical zoom lens set includes multiple lenses configured at one side of the optical element. The lenses move along a focusing direction to modify the focusing length. The focusing direction is substantially perpendicular to the viewing direction. The image sensing element is configured at one side of the optical zoom lens set, thereby allowing the light to pass through the transparent window, by the optical element guided to the optical zoom lens set, then passing through the lenses, and finally focusing on the image sensing element.

14 Claims, 7 Drawing Sheets

PORTABLE ELECTRONIC DEVICE AND CAMERA MODULE THEREOF

BACKGROUND OF THE INVENTION

1. Field of the Invention

The present invention relates to a portable electronic device and more particularly, to a portable electronic device equipped with a video module thereof.

2. Related Art

Please refer to FIG. 1 and FIG. 2. A portable electronic device (ex. notebook computer) 10 has a video module 12 disposed on the top of a flat display 11 and at the top side of a display panel D. The video module 12 is configured in a rotatable way on the flat display through a pivot A, thereby facilitating user's manual operation of modifying the direction of the camera lens L (as the arrow shown in FIG. 1) to capture images at different angles (such as the direction of the user side or the back side of the flat display 11).

Due to the space limitation, the camera lens L applied to the portable electronic device 10 is mostly the optical fixed-focus camera lens. In few examples that the camera lens is equipped with manual focusing function, there must be rotation mechanisms configured to connect with the camera lenses, thereby modifying the focal length of the camera lens.

However, said manual focusing camera lens may only modify the focal length in a small range but not in a wide margin of zooming operation. Meanwhile, the pivot A or said rotation mechanism is configured outside the flat display 11, which will undoubtedly decrease the waterproof function of the portable electronic device 10. Furthermore, the video module 12 is limited to the thickness of the flat display 11 of the portable electronic device 10, which is not able to contain the optical zoom lens with a longer focusing length.

SUMMARY OF THE INVENTION

Accordingly, the present invention provides a portable electronic device with a camera module configured on an outer frame of a flat display; in the meantime the focusing direction of the camera module is substantially perpendicular to the viewing direction of the flat display. Therefore, the operation of the camera module will not interfere with the display panel of the flat display, and the selection and operation of the camera module are not seriously limited to the thickness of the flat display. Hence the optical zoom lens set may be applied to one edge of the flat display.

According to a preferred embodiment of the present invention, the portable electronic device includes a flat display, a transparent window, an optical element, an optical zoom lens set and an image sensing element. The flat display includes a display panel with a viewing direction. The transparent window, the optical element, the optical zoom lens set and the image sensing element are all configure in the outer frame of the flat display. The transparent window and the optical element correspond to each other and align in the viewing direction. The optical zoom lens set includes multiple lenses configured at one side of the optical element. The lenses move along a focusing direction to modify the focusing length. The focusing direction is substantially perpendicular to the viewing direction. The image sensing element is configured at one side of the optical zoom lens set, thereby allowing the light to pass through the transparent window, by the optical element guided to the optical zoom lens set, then passing through the lenses, and finally focusing on the image sensing element, According to another preferred embodiment, a camera module is configured in a portable electronic device with a display. The display has an outer frame, an exposed display panel and a viewing direction. The camera module includes a transparent window, an optical element, an optical zoom lens set and an image sensing element. The transparent window, the optical element, the optical zoom lens set and the image sensing element are all configure in the outer frame of the flat display. The transparent window and the optical element correspond to each other and align in the viewing direction. The optical zoom lens set includes multiple lenses configured at one side of the optical element. The lenses move along a focusing direction to modify the focusing length. The focusing direction is substantially perpendicular to the viewing direction. The image sensing element is configured at one side of the optical zoom lens set, thereby allowing the light to pass through the transparent window, by the optical element guided to the optical zoom lens set, then passing through the lenses, and finally focusing on the image sensing element, These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
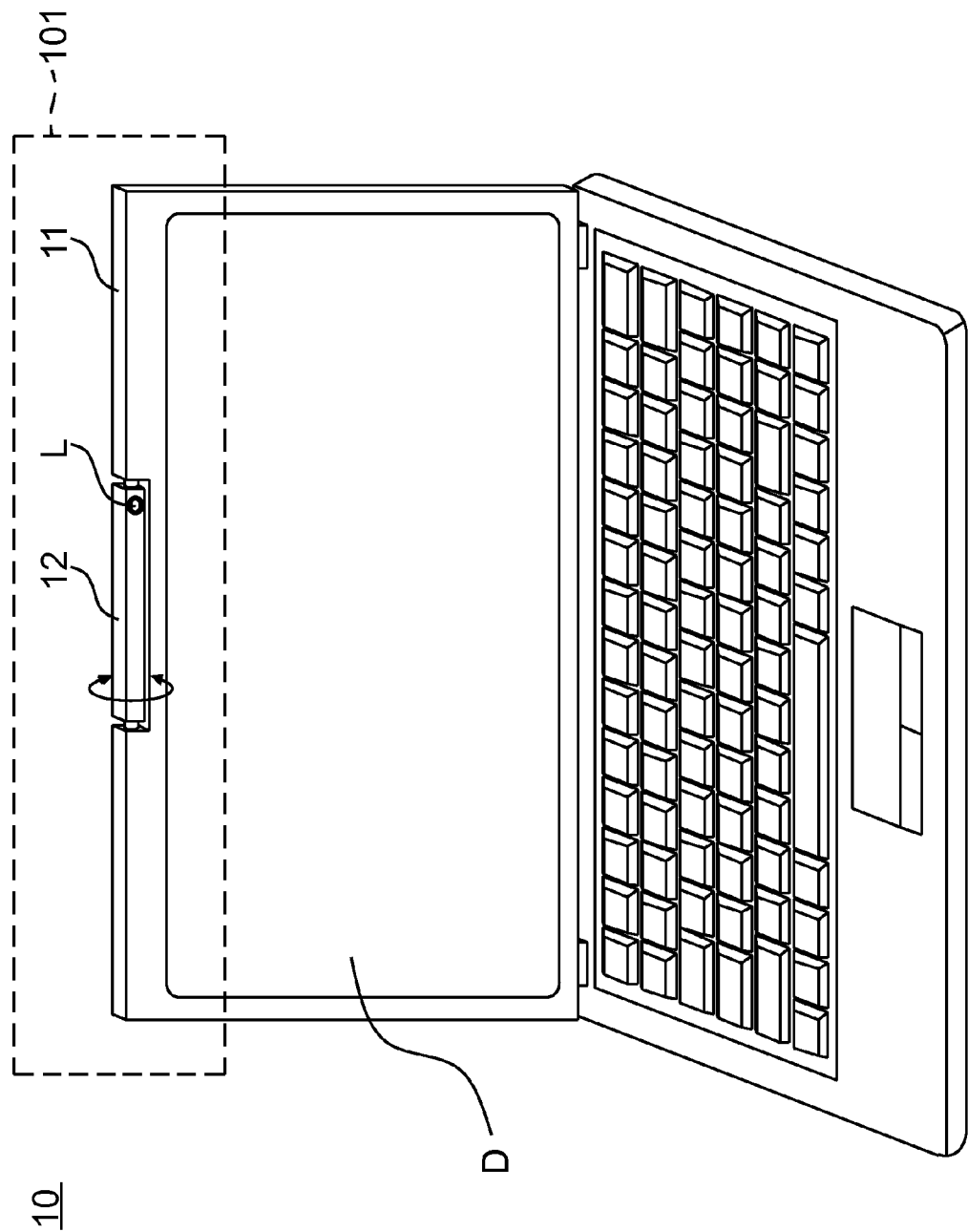
FIG. 1 is an explanatory view illustrating a portable electronic device in the prior art.
Figure 2:
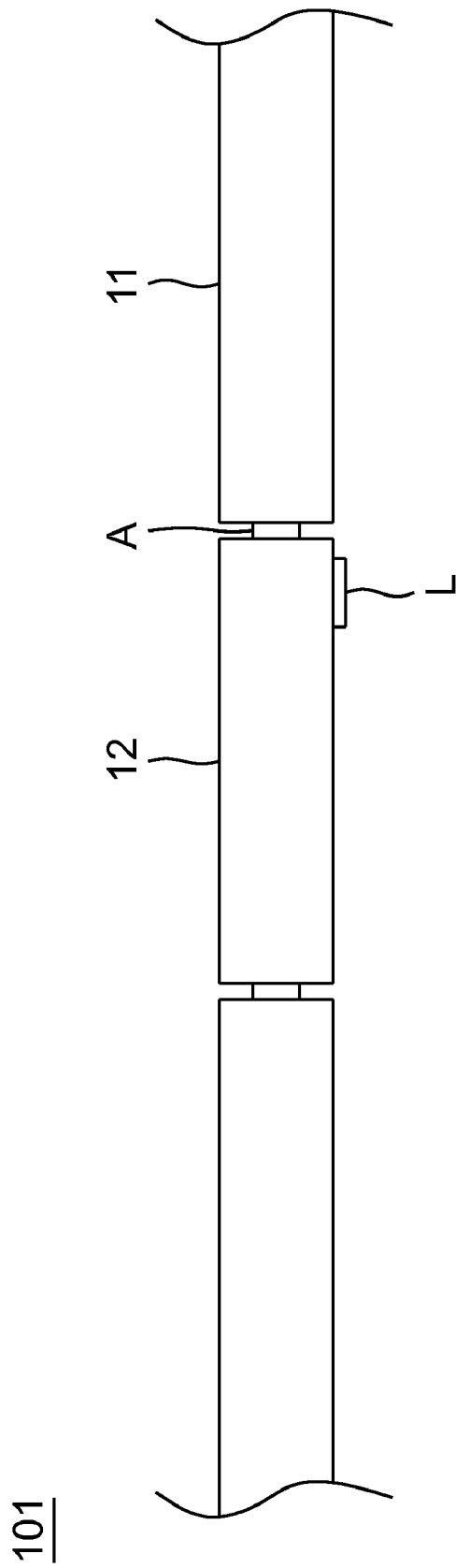
FIG. 2 is a vertical view of the area 101 in FIG. 1.

Reference will now be made in detail to the present preferred embodiments of the invention, examples of which are illustrated in the accompanying drawings. Wherever possible, the same reference numbers are used in the drawings and the description refers to the same or the like parts.

Figure 3:
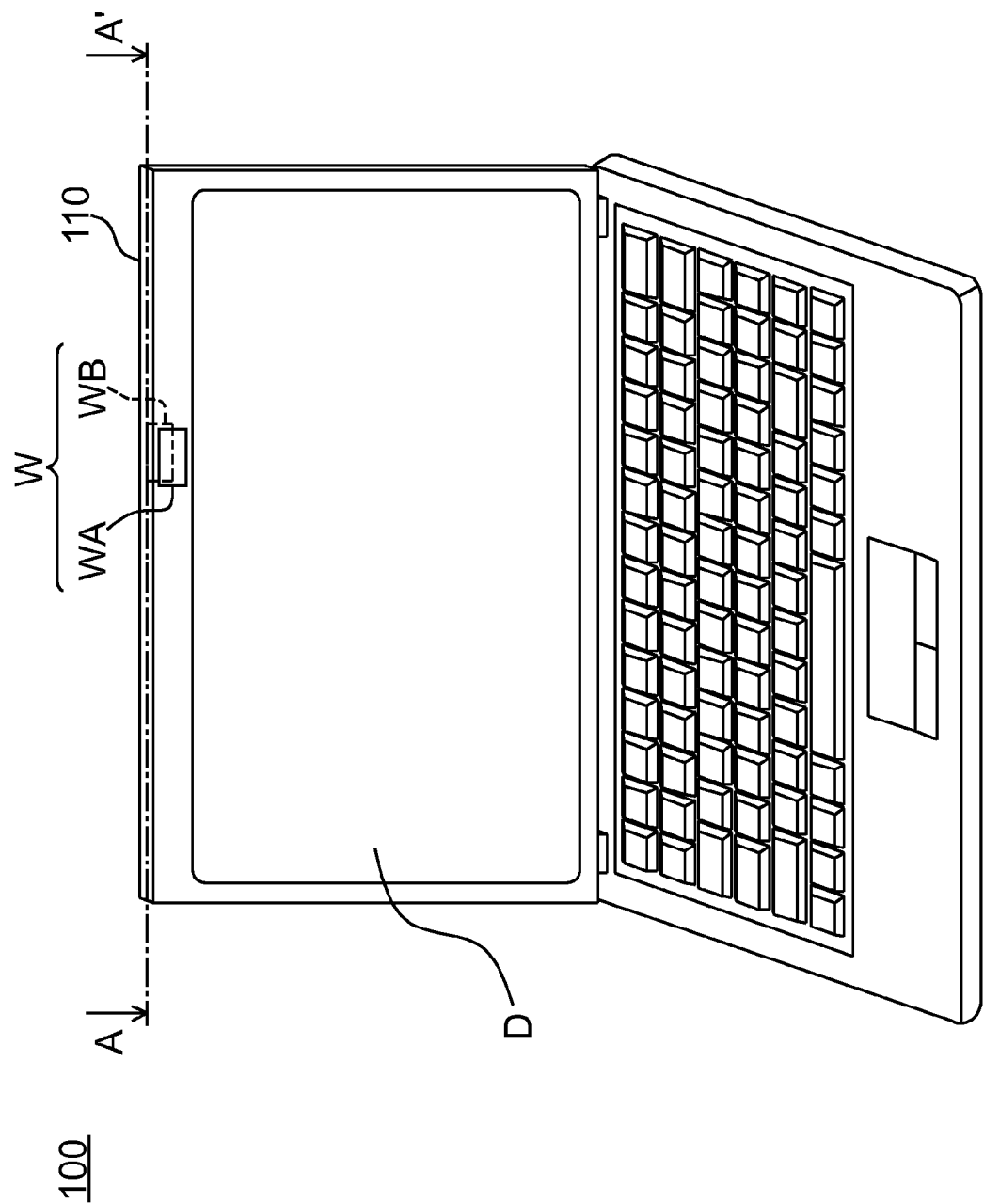
FIG. 3 is an explanatory view of a portable electronic device according to a preferred embodiment of the present invention.
Figure 4A:
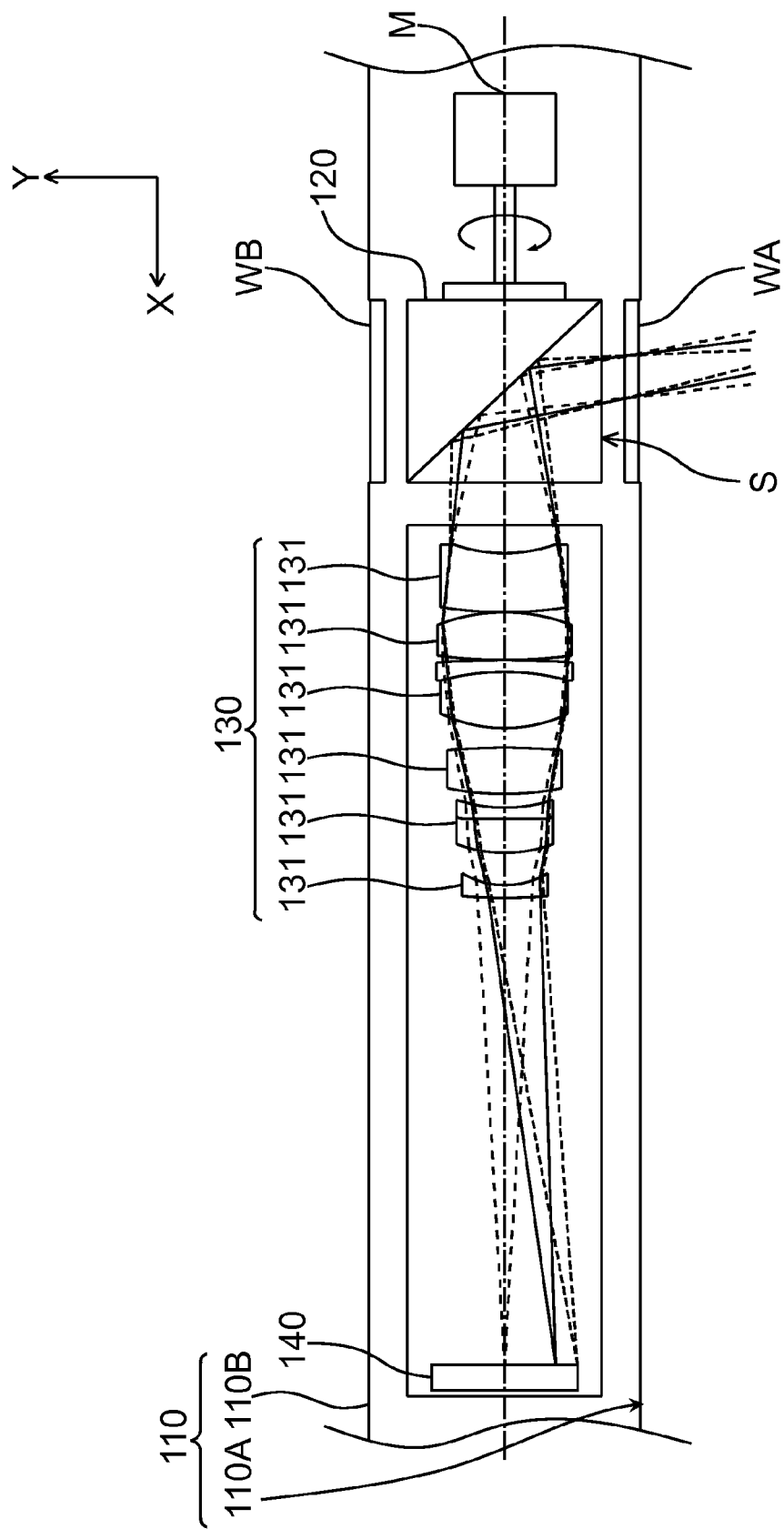
FIGS. 4A-4C are cross-sectional views cutting along the A-A' line.

Please refer to both FIG. 3 and FIG. 4A, a portable electronic device 100 of the present invention is a notebook computer. The portable electronic device 100 includes a display 110, a transparent window W, an optical element 120, an optical zoom lens set 130, an image sensing element 140 and a rotation motor M. A first surface of the display 110 has an outer frame and an exposed display panel thereon. The bottom of the display 110 is connected with the computer host through some attaching mechanisms and different signal lines. The camera module constructed by the transparent window W, the optical element 120, the optical zoom lens set 130, the image sensing element 140 and the rotation motor M, is configured in the outer frame of the display 110 but not limited to the top side of the outer frame as shown in the drawing. The transparent window W includes two transparent sections formed on the front side and the back side at the top (of the outer frame) of the display 110. The light may pass through the transparent window W and enter into the outer frame of the display 110.

The display 110 has a first surface 110A and a second surface 110B. The "viewing direction" Y of the display 110 is substantially perpendicular to the plane with the display 110 located thereon. The transparent window W includes a first window WA and a second window WB, configured at the top front side of the outer frame on the first surface 110A of the display 110 and configured at the top back side of the second surface 110B. In the present embodiment, the first surface 110A and the second surface 110B are opposite to each other, but not limited to the example hereby. In another preferred embodiment, the first surface 110A and the second surface 110B may be adjacent to each other, while the first window WA and the second window WB are configured adjacent to each other. The transparent window W is located in the viewing direction Y.

Figure 4B:
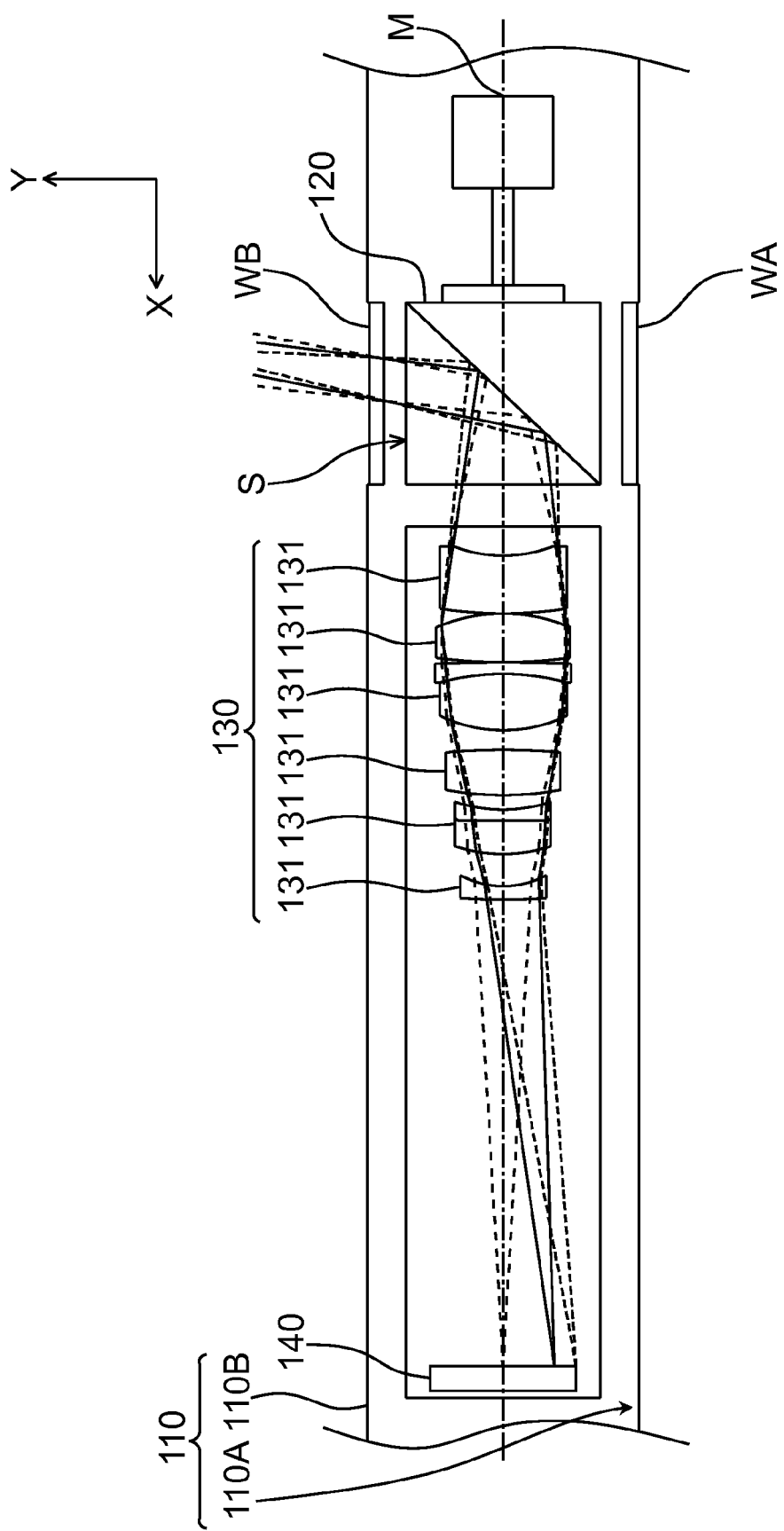

Please refer to both FIG. 4A and FIG. 4B. The optical element 120 is a vertical angle prism configured in the outer frame at top side of the display 110 and corresponding to the transparent window W (in the drawing the optical element 120 is located between the first window WA and the second window WB). The vertical angle prism used as the optical element has a light entrance surface S. Where the vertical angle prism is configured in the display 110, the light entrance surface is parallel to the transparent window W. Besides, the optical element 120 is connected with a rotation motor M configured in the display 110. Through the driven of the rotation motor M, the optical element 120 may rotate along a focusing direction X (as the arrow in FIG. 4A). The viewing direction Y is substantially perpendicular to the focusing direction X. Therefore the vertical angle prism may rotate so that the light entrance surface S is parallel to the first window WA and corresponds to each other (as shown in FIG. 4A); or alternatively, the light entrance surface S is parallel to the second window W2 and corresponds to each other (as shown in FIG. 4B).

In the preferred embodiment of the present invention, the optical element 120 is used to guide the light from the viewing direction to the focusing direction. The optical element 120 may utilize means of refraction, reflection or transmission to achieve the function of changing the direction of the light; but not limited to the examples hereby.

Figure 4C:
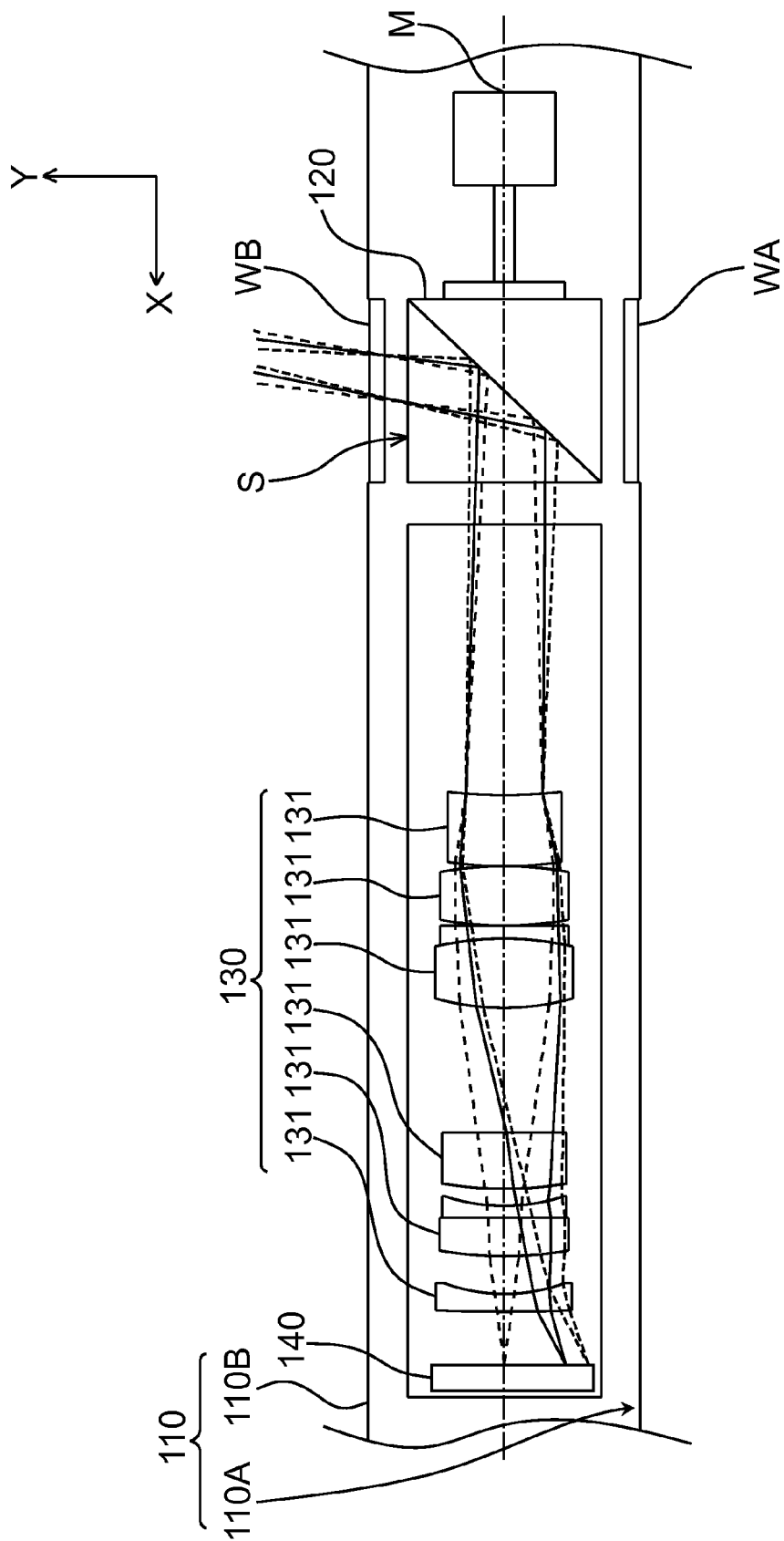

Refer to FIGS. 4A-4C; the optical zoom lens set 130 includes multiple lenses 131 configured corresponding to one side of the optical element 120. The lens 131 may move along the focusing direction X back and forward (as shown in FIG. 4C), thereby modifying the focal length and changing the depth of field.

The image sensing element 140 is also configured in the outer frame of the display 110, at one side of the optical zoom lens set 130, and located at an extending position of the focusing direction, so as to receive the light from optical zoom lens set 130 and sense the images. The light may enters into the display 110 through the transparent window W, entering into the optical element 120. And the optical element 120 guides the light to the optical zoom lens set 130, passing through the lens 131, and then finally focuses on the image sensing element 140.

Figure 5:
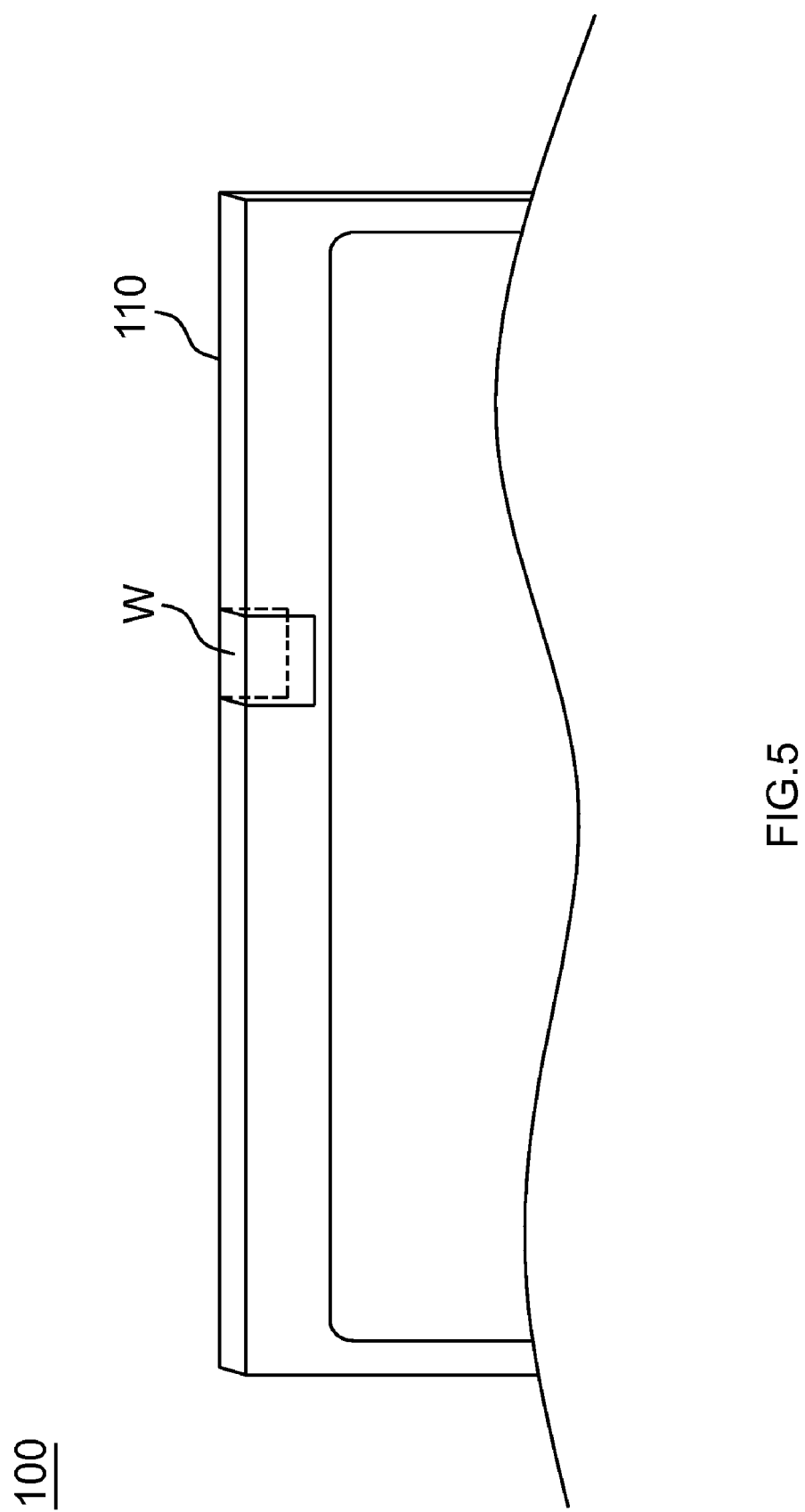
FIG. 5 is an explanatory view of another preferred embodiment of the present invention.

In the present invention, the optical element 120 of the portable electronic device 100 may rotates in the display 110 to guide the light of the scenes in different angles into the optical zoom lens set 130. In the present embodiment, when the light entrance surface S of the vertical angle prism and the first surface 110A face each other, the object images at the direction of the first window W1 may be captured. When the light entrance surface S of the vertical angle prism faces the second surface 110B, the object images at the direction of the second window W2 may be captured, but not limited to the examples hereby. As shown in FIG. 5, the transparent section extends from the first surface 110A of the display 110 to the second surface 110B so as to form a U-shaped transparent section. The optical element 120 may rotate between the first surface 110A and the second surface 110B. Meanwhile the light entrance surface S of the vertical angle prism may remain parallel to the transparent section when the light entrance surface S of the vertical angle prism rotates to face the transparent section. With the U-shaped transparent section, from the first surface 110A to the second surface 110B, about 270 degrees of object images may be captured into the display 110 through the transparent section.

Moreover, the rotation motor M and the optical zoom lens set 130 may electrically connect with a circuit board of the portable electronic device 100 respectively. Through circuit control to rotate the optical element 120 and modify the focal length of the optical zoom lens set 130, with the whole operations completed inside the display 110 yet without the rotation mechanism exposed outside the display 110, the possibility of the water leakage is approximately the lowest.

Besides, in the present invention, the optical zoom lens set 130 of the portable electronic device 100 is configured inside the display 110. The lens 131 may move within the display 110 in a wide range, thereby increasing the zooming range and making the distant object much clearer.

Although the rotation motor M has the advantages mentioned above, it is not the essential limitation of applying the optical zooming lens to the flat display according to the present invention. The first window WA and a fixed optical element 120 are enough to realize the application of the optical zooming lens onto the flat display.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. A portable electronic device, comprising:
    a display having least one outer frame and an exposed display panel, the display having a viewing direction; and
    a camera module located at a horizontal lateral side edge of the display, comprising:
        at least one transparent window, being configured on the outer frame of the display;
        an optical element, being configured in the outer frame of the display at the horizontal lateral side edge thereof and corresponding to the transparent window;
        a single lens assembly comprising an optical zoom lens set, configured at one side of the optical element, the optical zoom lens set comprising a plurality of lenses disposed along the horizontal lateral side edge of the display, the lenses moving along a focusing direction to modify the focal length, wherein the focusing direction is substantially perpendicular to the viewing direction so that the optical zoom lens set operates without interfering with the display panel;
        a rotation motor located along the horizontal lateral edge of the display at an opposite side to the single lens assembly with the optical element connected in between thereof; and an image sensing element, configured in the outer frame of the display at the horizontal lateral side edge thereof and at one side of the optical zoom lens set;

wherein the light passes through the transparent window, by the optical element guided to the optical zoom lens set, passing through the lenses, and finally focuses on the image sensing element;

wherein the display comprises a first surface and a second surface facing different directions, and the transparent window comprises a first window and a second window configured on the first surface and the second surface respectively; and wherein the optical element is a vertical angle prism with a light entrance surface, and the vertical angle prism is rotatable by the rotation motor so that the light entrance surface is parallel to the first window or the second window.

2. The portable electronic device as claimed in claim 1, wherein the first surface and the second surface are opposite to each other.

3. The portable electronic device as claimed in claim 1, wherein the first surface and the second surface are adjacent to each other.

4. The portable electronic device as claimed in claim 1 further comprising a circuit board configured in the display, wherein the optical zoom lens set and the circuit board are electrically connected with each other.

5. The portable electronic device as claimed in claim 1, wherein the transparent window is a continuous U-shaped transparent section extending from one side of the outer frame of the display to the opposite side and incorporating the first window and the second window.

6. The portable electronic device as claimed in claim 1, wherein the first window and the second window face in opposite directions.

7. The portable electronic device as claimed in claim 1, wherein the first window and the second window face in perpendicular directions.

8. A camera module configured in a portable electronic device with a display, the display having at least one outer frame, an exposed display panel and a viewing direction, the camera module located at a horizontal lateral side edge of the display and comprising:

at least one transparent window, configured on the outer frame of the display;

an optical element, being configured in the outer frame of the display at the horizontal lateral side edge thereof and corresponding to the transparent window;

a single lens assembly comprising an optical zoom lens set, being configured at one side of the optical element and comprising a plurality of lenses disposed along the horizontal lateral side edge of the display, the lenses moving a focusing direction to modify the focal length, wherein the focusing direction is substantially perpendicular to the viewing direction so that the optical zoom lens set operates without interfering with the display panel;

a rotation motor located along the horizontal lateral edge of the display at an opposite side to the single lens assembly with the optical element connected in between thereof; and an image sensing element, configured in the outer frame of the display at the horizontal lateral side edge thereof and at one side of the optical zoom lens set;

wherein the light passes through the transparent window, by the optical element guided to the optical zoom lens set, passing through the lenses, and finally focuses on the image sensing element;

wherein the display comprises a first surface and a second surface facing different directions, and the transparent window comprises a first window and a second window configured on the first surface and the second surface respectively; and wherein the optical element is a vertical angle prism with a light entrance surface, and the vertical angle prism is rotatable by the rotation motor so that the light entrance surface is parallel to the first window or the second window.

9. The camera module as claimed in claim 8, wherein the first surface and the second surface are opposite to each other.

10. The camera module as claimed in claim 8, wherein the first surface and the second surface are adjacent to each other.

11. The camera module as claimed in claim 8 further comprising a circuit board configured in the display, wherein the optical zoom lens set and the circuit board are electrically connected with each other.

12. The camera module as claimed in claim 8, wherein the transparent window is a continuous U-shaped transparent section extending from one side of the outer frame of the display to the opposite side and incorporating the first window and the second window.

13. The camera module as claimed in claim 8, wherein the first window and the second window face in opposite directions.

14. The camera module as claimed in claim 8, wherein the first window and the second window face in perpendicular directions.

* * * * *